UNITED STATES PATENT OFFICE.

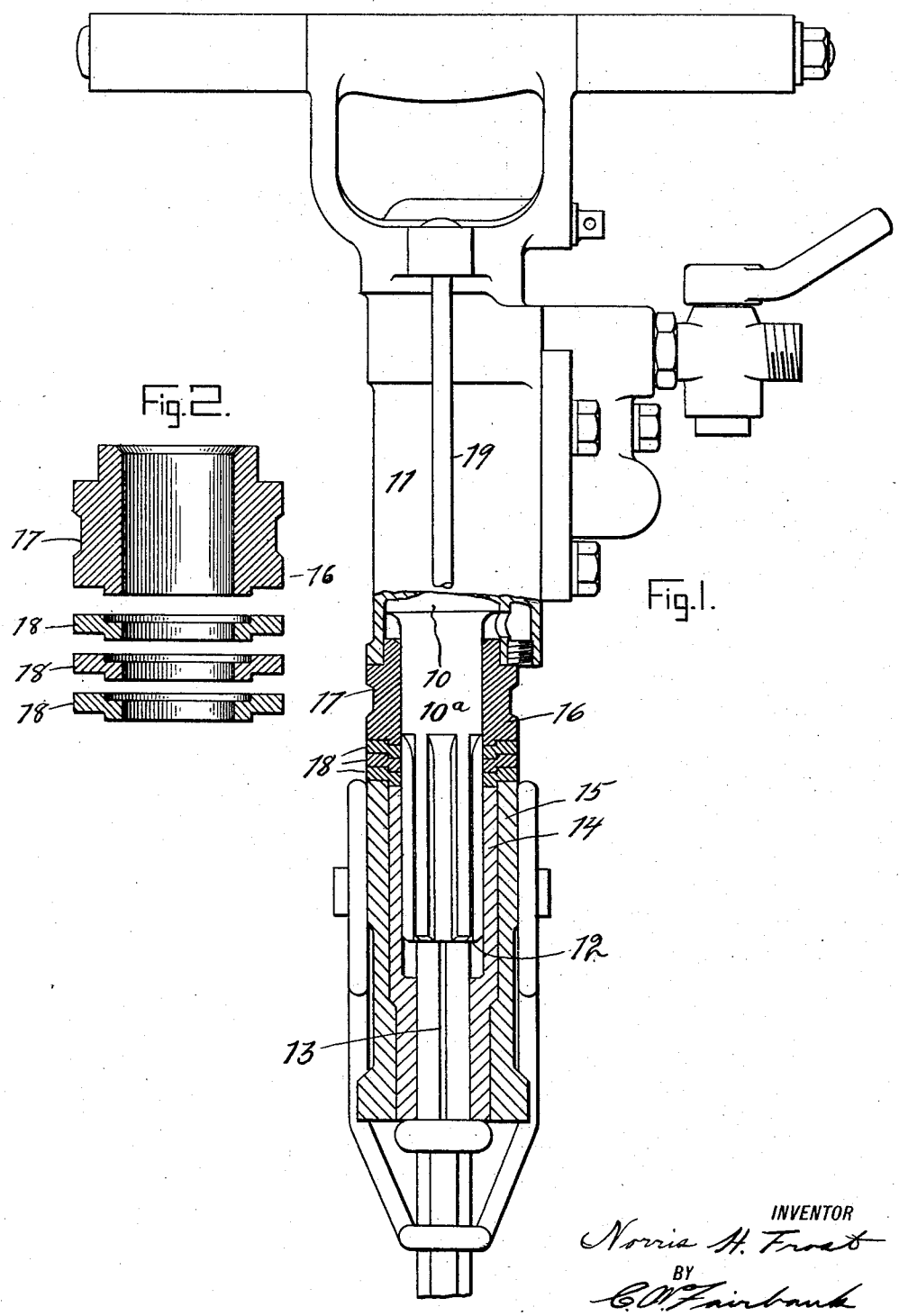

NORRIS H. FROST, OF WEST HOBOKEN, NEW JERSEY.

PNEUMATIC TOOL.

1,219,932.  Specification of Letters Patent.  Patented Mar. 20, 1917.

Application filed December 20, 1916. Serial No. 137,948.

*To all whom it may concern:*

Be it known that I, NORRIS H. FROST, a citizen of the United States, and a resident of West Hoboken, in the county of Hudson and State of New Jersey, have invented certain new and useful Improvements in Pneumatic Tools, of which the following is a specification.

This invention relates to certain improvements in pneumatic tools of that type in which there is a piston or plunger member mounted to rapidly reciprocate and has a portion for delivering blows to a drill or other tool.

In constructions of this type now in use, the blow delivering extension on the piston or plunger member, constituting the hammer bar, particularly when tempered too hard, will become chipped or broken at the point of contact with the drill or other tool. If this chipping or breaking away of the end continues until the operating face is rendered irregular or materially reduced in area, the piston must either be removed, discarded and replaced by a new one, or, in some cases, the end of the piston extension may be ground or turned so as to shorten its total length and present a new and smooth operating face. Only a very limited amount may be cut away to form this new operating face as otherwise the reciprocating member will become too short to strike the drill or other tool. It is usually impracticable to compensate for this shortening by lengthening the stroke of the piston or lengthening the drill or other tool to an amount equal to the part ground or cut away from the piston member in producing the new operating face. If a considerable number of pneumatic tools are in use on the same job, it is essential that they all be capable of use with the same drills and that the pistons all have the same stroke. The main object of my invention is to overcome these difficulties and to permit the piston extension to be ground down or cut away a considerable number of times to give the smooth operating face after successive chipping or breaking away of the highly tempered face, and without necessitating any corresponding lengthening of the drill or other tool.

In carrying out my invention, I form the front head washer or cylinder bushing of a plurality of annular, superposed sections, which, when taken together, conform in size and shape to the washer or bushing now employed. In case the piston extension becomes broken or chipped as hereinbefore referred to and the piston is turned or ground down to such an extent as to form a new operating face, one of the annular sections of the bushing or washer, of a thickness corresponding to the amount turned or ground away from the end of the piston member, after being ground away, may be advanced to substantially the same position as that to which it could travel when new. A plurality of sections of different thicknesses may be employed and the thicker one replaced by a thinner one each time the piston extension is ground or cut down, or a separate section may be removed each time the piston is cut or ground down, or where great accuracy is not needed, a section may be removed only after the piston extension has been refaced a plurality of times, that is if the amount removed from the piston in refacing be comparatively small.

By removing one of the sections of the bushing or washer, the front head and its parts and also the shank of the tool may come closer to the piston, thereby proper operative relationship between the piston and the tool may be restored without changing the stroke of the piston or the length of the shank of the tool.

The operation of cutting down the piston extension to reface it and the corresponding reduction in the total effective length of the washer or bushing may be repeated until the piston has been so reduced in length as to be no longer of any service. A new piston with an extension of the full length may then be substituted for the old one and the sections of the bushing or washer restored to their original position and the device will be as good as new except of course for wear on the other parts.

My invention is applicable to various types of pneumatic tools and for that reason I do not wish to be limited to any specific construction. More particularly, I do not desire to be limited to the specific type of pneumatic tool in connection with which I have illustrated my invention. In the accompanying drawings, I have shown my invention as applied to a "Butterfly Jackhamer" plug drill manufactured by Ingersoll-Rand Company of New York. In these drawings, Figure 1 is a part side elevation and part section of a pneumatic tool embodying my invention, and Fig. 2 is a central longitudinal section of one form of my improved front head washer or cylinder bushing removed from the tool.

In the specific construction illustrated, a piston 10 is mounted to reciprocate in a cylinder 11 and has an extension 10ª presenting an operating face 12 adapted to strike the end of the shank 13 of the drill or other tool. The end of the piston extension and the end of the shank 13 of the tool are guided in a rotation sleeve 14, which latter is mounted in a front head 15. The latter is separated from the main cylinder by the front head washer 16.

As the most important feature of my invention, I make this front head washer or cylinder bushing of a plurality of superposed annular sections. In Fig. 2, I have shown a main section 17 and three similar, comparatively thin, auxiliary sections 18. The sections are so flanged or cut that when assembled they will be held in axial alinement and will act as a single device. In the construction illustrated the parts are held together by short studs 19 having springs (not shown) at their lower ends which continually tend to draw the front head upwardly toward the cylinder.

When the face 12 chips or breaks away so that it must be refaced by cutting or grinding away a part of the piston extension, I restore the original operative relationship between the piston face and the end of the shank of the tool by removing a section 18 of the front head washer and of a thickness substantially equal to the amount which was cut or ground away from the piston extension during the refacing operation. If the amount cut away from the piston extension be comparatively small, it would not be necessary to remove a section for each refacing, that is, if a slight variation in the operative relationship of the piston and shank is not important. To maintain the exact relationship, a thinner section may be substituted for one of the sections 18 if the amount cut or ground away in the refacing of the piston be less than the thickness of one of the sections 18.

It will be noted that by means of my invention, I am able to maintain a substantially constant operative relationship of the drill to the shank of the tool during successive reductions in the total length of the piston and its blow delivering extension, without varying the length of the piston stroke or the length of the shank.

Having thus described my invention, what I claim as new and desire to secure by Letters Patent is:

1. A pneumatic tool including a cylinder, a piston having a blow delivering extension, a front head for receiving the shank of a tool, and a washer or bushing interposed between said cylinder and said front head and formed of a plurality of superposed, separable, annular sections.

2. A pneumatic tool including a cylinder, a piston therein having a blow delivering extension, a part to be struck thereby, means for holding said part being in operative position in respect to the striking face of said extension, and means for adjusting said first mentioned means axially to compensate for reductions in the effective length of the piston extension when the latter is refaced after being chipped or broken.

3. A pneumatic tool including a cylinder, a piston having a blow delivering extension, a front head for receiving the shank of a tool, and a washer or bushing interposed between said cylinder and said front head and formed of a plurality of superposed, annular sections interengaging to remain concentric and one or more of which may be removed to compensate for reductions in the length of said piston extension when the latter is shortened by refacing.

Signed at New York in the county of New York and State of New York this 15th day of December, A. D. 1916.

NORRIS H. FROST.

Copies of this patent may be obtained for five cents each, by addressing the "Commissioner of Patents, Washington, D. C."

It is hereby certified that in Letters Patent No. 1,219,932, granted March 20, 1917, upon the application of Norris H. Frost, of West Hoboken, New Jersey, for an improvement in "Pneumatic Tools," an error appears in the printed specification requiring correction as follows: Page 2, line 74, claim 2, strike out the word "being"; and that the said Letters Patent should be read with this correction therein that the same may conform to the record of the case in the Patent Office.

Signed and sealed this 17th day of April, A. D., 1917.

[SEAL.]

R. F. WHITEHEAD,
*Acting Commissioner of Patents.*

Cl. 121—20.